(12) United States Patent
Hertlein et al.

(10) Patent No.: US 9,103,440 B2
(45) Date of Patent: Aug. 11, 2015

(54) MOTOR VEHICLE DRIVE TRAIN DEVICE COMPRISING A MULTI-GROUP TRANSMISSION AND SHIFTING METHOD FOR A MULTI-GROUP TRANSMISSION

(71) Applicant: Daimler AG, Stuttgart (DE)

(72) Inventors: Juergen Hertlein, Weinstadt (DE); Andreas Klaus, Winnenden (DE); David Ulmer, Schoenaich (DE)

(73) Assignee: Diamler AG, Stuttgart (DE)

( * ) Notice: Subject to any disclaimer, the term of this patent is extended or adjusted under 35 U.S.C. 154(b) by 0 days.

(21) Appl. No.: 14/386,581

(22) PCT Filed: Jan. 30, 2013

(86) PCT No.: PCT/EP2013/000273
§ 371 (c)(1),
(2) Date: Sep. 19, 2014

(87) PCT Pub. No.: WO2013/139416
PCT Pub. Date: Sep. 26, 2013

(65) Prior Publication Data
US 2015/0081180 A1    Mar. 19, 2015

(30) Foreign Application Priority Data
Mar. 21, 2012  (DE) .......................... 10 2012 005 675

(51) Int. Cl.
*F16H 61/70*  (2006.01)
*F16H 61/04*  (2006.01)
F16H 37/04  (2006.01)

(52) U.S. Cl.
CPC ............ *F16H 61/70* (2013.01); *F16H 61/0403* (2013.01); *F16H 61/702* (2013.01); *F16H 37/046* (2013.01); *F16H 2306/48* (2013.01)

(58) Field of Classification Search
CPC ............................ F16H 61/0403; F16H 61/70
USPC ............................................ 701/51
See application file for complete search history.

(56) References Cited

U.S. PATENT DOCUMENTS

| 6,463,823 | B2 | 10/2002 | Walker |
| 7,021,170 | B2 | 4/2006 | Doebele |

(Continued)

FOREIGN PATENT DOCUMENTS

| DE | 43 05 762 A1 | 9/1994 |
| DE | 101 52 857 A1 | 5/2003 |
| DE | 600 32 701 T2 | 11/2007 |
| DE | 10 2007 010 827 A1 | 9/2008 |

(Continued)

OTHER PUBLICATIONS

International Search Report dated Mar. 20, 2013 with English translation (seven (7) pages).

(Continued)

*Primary Examiner* — Edwin A Young
(74) *Attorney, Agent, or Firm* — Crowell & Moring LLP (57) ABSTRACT

A motor vehicle drive train device has a multi-group transmission that includes a main group, a front-mounted group upstream from the main group, and/or a downstream group downstream from the main group, and a control/regulation unit. The motor vehicle drive train device is provided for shifting, at least in one transmission gear change operation, the front-mounted group and/or the downstream group into neutral before engaging a target gear in the main group. The control/regulation unit is provided for shifting the front-mounted group and/or the downstream group into neutral in the transmission gear change operation only after at least partial synchronization of the main group.

18 Claims, 2 Drawing Sheets

(56) References Cited

U.S. PATENT DOCUMENTS

| | | |
|---|---|---|
| 2004/0261556 A1 | 12/2004 | Doebele |
| 2006/0142918 A1* | 6/2006 | Guggolz et al. ................ 701/51 |
| 2008/0228431 A1* | 9/2008 | Guggolz et al. ............. 702/147 |
| 2009/0071274 A1 | 3/2009 | Bader et al. |
| 2009/0150033 A1* | 6/2009 | Kawamoto ..................... 701/51 |
| 2010/0323845 A1 | 12/2010 | Miller et al. |
| 2011/0315462 A1* | 12/2011 | Kaltenbach ............... 180/65.27 |
| 2012/0031230 A1* | 2/2012 | Guggolz et al. ........... 74/665 L |
| 2013/0008271 A1 | 1/2013 | Guggolz et al. |

FOREIGN PATENT DOCUMENTS

| | | |
|---|---|---|
| DE | 10 2007 043 694 A1 | 3/2009 |
| DE | 10 2010 009 673 A1 | 9/2011 |
| EP | 1 438 525 B1 | 6/2006 |
| EP | 2 037 159 A2 | 3/2009 |
| WO | WO 2011/062544 A1 | 5/2011 |

OTHER PUBLICATIONS

German Search Report dated Nov. 9, 2012, including English translation (ten (10) pages).

* cited by examiner

MOTOR VEHICLE DRIVE TRAIN DEVICE COMPRISING A MULTI-GROUP TRANSMISSION AND SHIFTING METHOD FOR A MULTI-GROUP TRANSMISSION

BACKGROUND AND SUMMARY OF THE INVENTION

Exemplary embodiments of the invention relate to a motor vehicle drive train device.

European patent document EP 1 438 525 B1 discloses a motor vehicle drive train device having a multi-group transmission, which includes a main group, a front-mounted group upstream from the main group, and a downstream group downstream from the main group, and a control and/or regulation unit, the motor vehicle drive train device being provided for shifting, at least in one transmission gear change operation, the front-mounted group and the downstream group into neutral before engaging a target gear in the main group.

A motor vehicle drive train device having a multi-group transmission is likewise known from European patent document EP 2 037 159 A2, related to the same species, which includes a main group, a front-mounted group upstream from the main group, and a downstream group downstream from the main group, and a control and/or regulation unit, the motor vehicle drive train device being provided for shifting, at least in one transmission gear change operation, the front-mounted group and the downstream group into neutral before engaging a target gear in the main group. In addition, this publication discloses that the control and/or regulation unit is provided for shifting the front-mounted group and/or the downstream group into neutral in the transmission gear change operation only after at least partial synchronization of the main group.

Exemplary embodiments of the present invention are directed to enhancing shifting comfort. Exemplary embodiments of the present invention are directed to a motor vehicle drive train device having a multi-group transmission which includes a main group, a front-mounted group upstream from the main group, and/or a downstream group downstream from the main group, and a control and/or regulation unit, the motor vehicle drive train device being for shifting, at least in one transmission gear change operation, the front-mounted group and/or the downstream group into neutral before engaging a target gear in the main group.

In addition, the control and/or regulation unit is provided for shifting the front-mounted group and/or the downstream group into neutral in the transmission gear change operation only after at least partial synchronization of the main group. In this way an advantageous point in time may be found for shifting the front-mounted group and/or the downstream group into neutral, as the result of which active mass moments of inertia for engaging the target gear may be reduced in a particularly advantageous manner. A difference in rotational speeds between shafts and/or components to be synchronized, in particular between a main shaft of the main group and a countershaft, in which it is possible to engage a target gear, in particular a transmission gear opposite to a current direction of travel, without at least significant loss of comfort, may be increased, as the result of which synchronization of the multi-group transmission for engaging the target gear, in particular the transmission gear opposite to the current direction of travel, may be improved, and rattling and/or "shift shock" may be at least reduced. It is thus possible to improve the engagement of the transmission gear opposite to the current direction of travel and/or the shifting of the transmission gear opposite to the current direction of travel. In addition, the likelihood of a tooth-to-tooth position may be reduced, thus allowing increased shifting comfort for the target gear and enhanced customer satisfaction.

A "multi-group transmission" is understood in particular to mean a transmission that is composed of a combination of one-, two-, or multi-stage single gears.

A "main group" is understood in particular to mean a single gear which is intended for providing and/or setting at least one forward transmission gear and at least one reverse transmission gear, and/or has at least two settable gear ratios that are opposite one another, and which thus differ in their algebraic signs.

A "downstream group" is understood in particular to mean a single gear downstream from the main group that provides at least two different gear ratios for increasing the number of gears, and/or which is intended for providing a fast transmission gear and a slow transmission gear provided by means of the main group.

A "front-mounted group" is understood in particular to mean a single gear situated upstream from the main group and which provides at least two different gear ratios in order to increase the number of gears. A gear ratio may preferably also have a value of 1.

The terms "upstream from" and "downstream from" are understood in particular to mean in relation to a flow of force that is present for drive wheels driven by the drive machine and/or for an active drive machine, i.e., which preferably provides drive torque, and which is in drive connection with the multi-group transmission.

A "control and/or regulation unit" is understood in particular to mean a unit including at least one control device. A "control device" is understood in particular to mean a unit having a processor unit and a memory unit as well as an operating program that is stored in the memory unit. In principle, the control and/or regulation unit may include multiple interconnected control devices which preferably are provided for communicating with one another via a bus system, such as a CAN bus system.

A "transmission gear change operation" is understood in particular to mean an operation in which, starting from a transmission gear that is currently engaged, i.e., preferably an actual gear, a target gear is shifted during travel, the operation advantageously being initiated by a driver of the motor vehicle which has the motor vehicle drive train device and/or by the shifting instruction triggered by the control and/or regulation unit.

The term "engaging a target gear" is understood in particular to mean setting a gear ratio associated with the corresponding target gear within the main group, and/or establishing a torque-transmitting connection between all coupling units of the main group which are provided for the corresponding target gear. The target gear is preferably engaged by the main group.

The term "shifting a target gear" is understood in particular to mean setting a torque-transmitting connection between a drive machine and drive wheels of the motor vehicle when the target gear is engaged. An operation in which the target gear is shifted preferably constitutes an operation in which the target gear is engaged. The shifting of the target gear preferably constitutes disengagement of an actual gear, engagement of the corresponding target gear, and lastly, engagement of a starting clutch for establishing the torque-transmitting connection between the drive machine and the drive wheels.

The term "front-mounted group shifted into neutral" is understood in particular to mean an actuation state of the front-mounted group in which torque transmission by the front-mounted group is prevented, the front-mounted group preferably having a defined neutral position or being capable of being brought into a position in which the torque transmission is prevented. For a front-mounted group shifted into neutral, the main group is preferably drive-decoupled from a transmission input shaft.

The term "downstream group shifted into neutral" is understood in particular to mean an actuation state of the downstream group in which transmission of torque by the downstream group is prevented, for this purpose the downstream group preferably having a defined neutral position or being capable of being brought into a position in which the transmission of torque is prevented. For a downstream group shifted into neutral, the main group is preferably drive-decoupled from the transmission output shaft.

The term "shifting after at least partial synchronization of the main group" is understood in particular to mean shifting when the main group is at least partially synchronized and/or after a start of a synchronization phase of the main group, whereby the synchronization and/or the synchronization phase may preferably also already be concluded.

The term "synchronization of the main group" is understood in particular to mean adjustment of speed differences between at least two shafts to be synchronized, preferably a main shaft and a countershaft, and/or components, preferably claws, of the main group. The control and/or regulation unit preferably delays the shifting of the front-mounted group and/or the downstream group into neutral until a point in time when the main group is at least partially synchronized.

A "transmission gear opposite to the current direction of travel" is understood in particular to mean a target gear provided for a direction of travel that is oriented opposite to a direction of travel for which an actual gear, which is shifted when there is a request for the target gear, is provided. For an engaged forward transmission gear, and thus for forward travel, the transmission gear opposite to the current direction of travel is preferably provided as the reverse transmission gear, and for an engaged reverse transmission gear, and thus for reverse travel, the transmission gear opposite to the current direction of travel is preferably provided as the forward transmission gear.

The term "forward transmission gear" basically includes all forward transmission gears that are shiftable by means of the multi-group transmission, in particular a starting transmission gear that is provided for forward travel, and thus, a so-called first forward transmission gear.

The term "reverse transmission gear" basically includes all reverse transmission gears that are shiftable by means of the multi-group transmission, in particular a starting transmission gear that is provided for reverse travel.

A "current direction of travel" is understood in particular to mean a direction of travel in which the motor vehicle is moving when the transmission gear change operation is initiated, and thus, during the shifting instruction and/or when the transmission gear is requested.

The term "provided" is understood in particular to mean specially programmed, designed, equipped, configured, and/or situated.

According to the invention, the control and/or regulation unit is provided for shifting the downstream group in the transmission gear change operation when the front-mounted group is shifted into neutral. The mass moment of inertia during shifting of the downstream group may thus be reduced, the main gear or the main group being shifted at the same time. The control and/or regulation unit preferably shifts the downstream group into its target position after the target gear is engaged, with the front-mounted group shifted into neutral.

Furthermore, the control and/or regulation unit is provided for shifting the front-mounted group and/or the downstream group into neutral in the transmission gear change operation only shortly before the target gear is engaged. As a result, the front-mounted group and/or the downstream group may be shifted into neutral at a particularly advantageous point in time. The control and/or regulation unit preferably delays the shifting of the front-mounted group and/or the downstream group into neutral until shortly before the target gear is engaged. The term "shortly before the target gear is engaged" is understood in particular to mean 0.5 second maximum, advantageously 0.2 second maximum, and particularly advantageously 0.1 second maximum, before the target gear is engaged. The engagement of the target gear in the main group and the shifting of the front-mounted group and/or the downstream group into neutral preferably lie in a time window of 0.5 second maximum, advantageously 0.2 second maximum, and particularly advantageously 0.1 second maximum.

Additionally, the control and/or regulation unit is provided for shifting the front-mounted group and/or the downstream group into neutral in the transmission gear change operation during a synchronization phase of the main group, as the result of which the target gear may be shifted particularly rapidly. A "synchronization phase" is understood in particular to mean a phase in the transmission gear change operation in which the main group is synchronized for engaging the target gear. The control and/or regulation unit preferably shifts the front-mounted group and/or the downstream group into neutral shortly before or upon conclusion of the synchronization phase. In principle, the control and/or regulation unit may shift the front-mounted group and/or the downstream group into neutral only shortly after the synchronization phase.

In addition, it is advantageous when the control and/or regulation unit is provided for shifting first the downstream group, and then the front-mounted group, into a target position in the transmission gear change operation after the target gear is engaged. A particularly advantageous transmission gear change operation may be provided in this way. A "target position of the downstream group" is understood in particular to mean a shift position of the downstream group in which a torque is transmitted by the downstream group. A "target position of the front-mounted group" is understood in particular to mean a shift position of the front-mounted group in which a torque is transmitted by the front-mounted group.

Furthermore, it is advantageous when the control and/or regulation unit is provided for shifting the front-mounted group and/or the downstream group into neutral in the transmission gear change operation when the main group is shifted into neutral. The transmission gear change operation may be further improved in this way. A "main group shifted into neutral" is understood in particular to mean that a transmission gear is not engaged within the main group. The control and/or regulation unit advantageously shifts the front-mounted group and/or the downstream group into neutral when the transmission gear is disengaged and/or after the actual gear is disengaged.

In addition, it is advantageous when the motor vehicle drive train device has a synchronization unit provided for providing a braking torque and/or a drive torque in order to synchronize the main group. The main group may thus be synchronized in a particularly advantageous manner. The control and/or regulation unit advantageously controls the synchronization unit in order to synchronize the main group. The control and/or regulation unit preferably shifts the front-mounted group and/or the downstream group into neutral during the control of the synchronization unit. The term "control of the synchronization unit" is understood in particular to mean a setting of the braking torque and/or the drive torque to be greater than zero.

The main group is particularly preferably designed as an unsynchronized claw clutch transmission group. A cost-effective multi-group transmission may be provided in this way. A "claw clutch transmission group" is understood in particular to mean a single gear having coupling units designed as claw clutches and/or claw brakes for setting the corresponding gear ratios. For engaging the transmission gears, the main group advantageously has positive-fit claw clutches that are unsynchronized, i.e., free of synchronous elements, and which are preferably engaged and disengaged by means of a sliding sleeve.

In addition, it is advantageous when the front-mounted group and/or the downstream group has/have a synchronized design, thus allowing further enhancement of shifting comfort. A "front-mounted group having a synchronized design" is understood in particular to mean a front-mounted group which for setting the corresponding gear ratio has positive-fit coupling units, preferably claw clutches, which are synchronized, i.e., having synchronous elements, and which are preferably engaged and disengaged by means of a sliding sleeve. A "downstream group having a synchronized design" is understood in particular to mean a downstream group which for setting the corresponding gear ratio has positive-fit coupling units, preferably claw clutches, which are synchronized, i.e., having synchronous elements, and which are preferably engaged and disengaged by means of a sliding sleeve.

In addition, a shifting method for a multi-group transmission of a motor vehicle drive train device, in particular a motor vehicle drive train device according to the invention, is proposed in which, in at least in one transmission gear change operation, a front-mounted group and/or a downstream group is/are shifted into neutral before engaging a target gear in a main group, the front-mounted group and/or the downstream group being shifted into neutral in the transmission gear change operation only after at least partial synchronization of the main group. Mass moments of inertia for engaging the target gear may be advantageously reduced in this way.

Further advantages result from the following description of the drawings. One exemplary embodiment of the invention is illustrated in the drawings. The drawings, the description, and the claims contain numerous features in combination. Those skilled in the art will also advantageously consider the features individually and combine them into further meaningful combinations.

DETAILED DESCRIPTION

Figure 1:
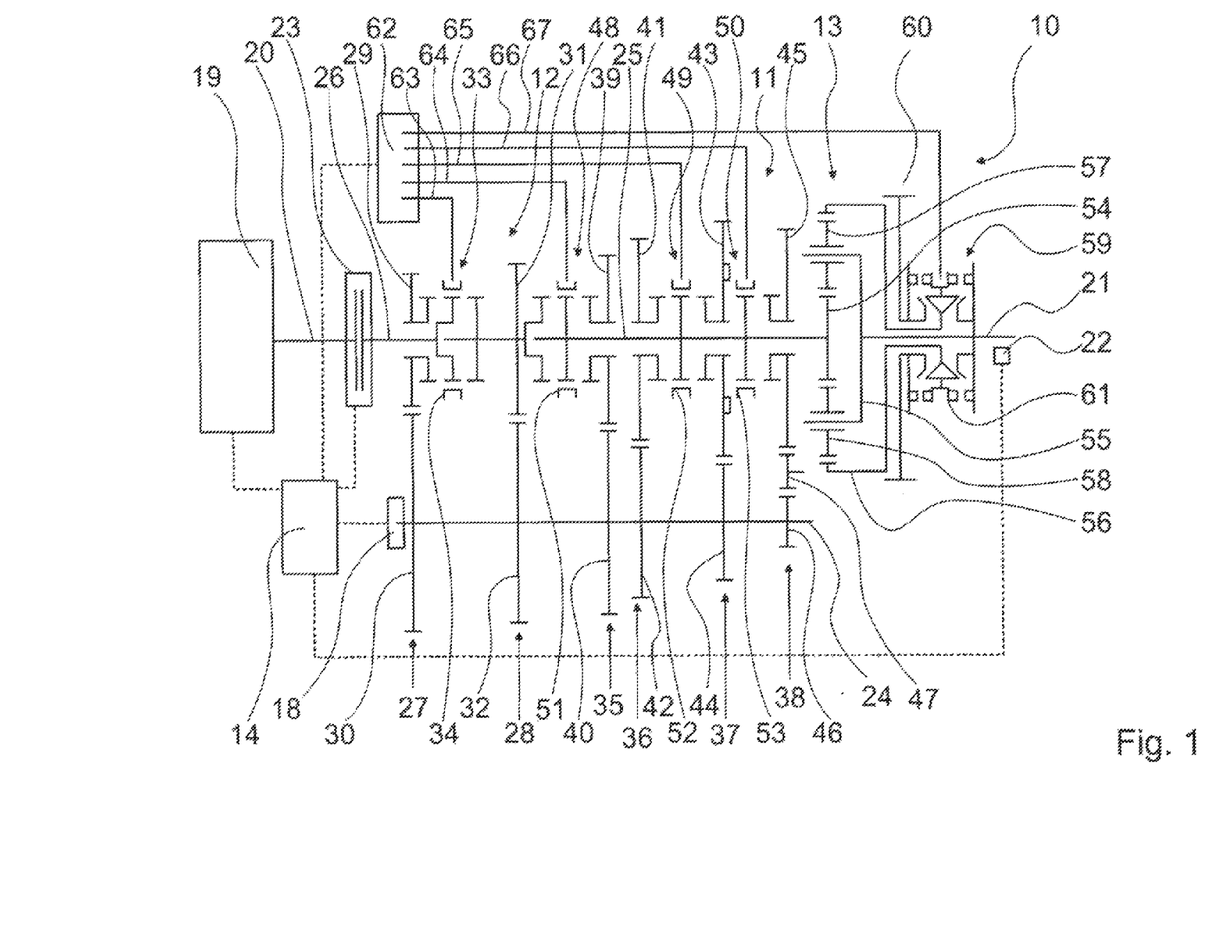
FIG. 1 shows a schematic illustration of a motor vehicle drive train device having a multi-group transmission.

FIG. 1 schematically shows a motor vehicle drive train of a motor vehicle, not illustrated in greater detail, having a motor vehicle drive train device. The motor vehicle drive train device has a multi-group transmission 10 for setting multiple transmission gears. The multi-group transmission 10 provides 16 transmission gears. The motor vehicle drive train has a drive machine 19 for providing a drive torque. The drive machine 19 is situated upstream from the motor vehicle drive train device. In addition, the motor vehicle drive train has drive wheels, not illustrated in greater detail. The drive machine 19 is designed as an internal combustion engine. The motor vehicle is designed as a truck. The multi-group transmission 10 is designed as a truck transmission which is an automatic transmission. In principle, the multi-group transmission 10 may also provide a different number of transmission gears which appears meaningful to those skilled in the art.

The motor vehicle drive train device has a drive shaft 20 for introducing the drive torque into the multi-group transmission 10. The drive shaft 20 connects the multi-group transmission 10 to the drive machine 19. The motor vehicle drive train device has a transmission output shaft 21 for leading out a drive torque which is converted by an overall gear ratio. The transmission output shaft 21 connects the multi-group transmission 10 to the drive wheels via an axle gear, not illustrated in greater detail. The motor vehicle drive train device has a rotational speed sensor 22 with rotational direction recognition for recognizing a current direction of travel and for adjusting to a desired direction of travel. The rotational speed sensor 22 is situated on the transmission output shaft 21, and detects a rotational speed and a rotational direction of the transmission output shaft 21.

The motor vehicle drive train device has a starting clutch 23 for establishing and separating a drive connection between the drive machine 19 and the multi-group transmission 10. The starting clutch 23 is designed as a multi-plate clutch. The starting clutch 23 has a disengaged state and an engaged state. In the disengaged state the starting clutch 23 is unpressurized. In the disengaged state of the starting clutch 23, the drive connection between the drive machine 19 and the multi-group transmission 10 is separated, and a drive torque cannot be transmitted from the drive machine 19 into the multi-group transmission 10. In the engaged state the starting clutch 23 is acted on by a pressure. The drive connection between the drive machine 19 and the multi-group transmission 10 is established in the engaged state of the starting clutch 23. The drive torque may be introduced by the drive machine 19 into the multi-group transmission 10. The drive machine 19 is situated upstream from the starting clutch 23.

The multi-group transmission 10 has a main group 11, a front-mounted group 12, and a downstream group 13. The front-mounted group 12 is situated upstream from the main group 11. The downstream group 13 is situated downstream from the main group 11. The main group 11 provides four different forward transmission gears and one reverse transmission gear. The main group 11 includes a countershaft 24. The countershaft 24 is situated in parallel to the drive shaft 20. The main group 11 has a main shaft 25 situated coaxially with respect to the drive shaft 20. The main group 11 is designed as a main gear. The main shaft 25 is situated coaxially with respect to the transmission output shaft 21. The main group 11 is situated upstream from the drive wheels. The main group 11 is designed as a countershaft.

The front-mounted group 12 has a transmission input shaft 26 situated coaxially with respect to the drive shaft 20. The transmission input shaft 26 connects the multi-group transmission 10 to the starting clutch 23. The front-mounted group 12 is connectable to the main group 11 via the countershaft 24. The front-mounted group 12 is situated downstream from the starting clutch 23. The front-mounted group 12 includes two different gearwheel pairs 27, 28 for providing an operative connection of the transmission input shaft 26 to the countershaft 24. The gearwheel pairs 27, 28 have different gear ratios. The gearwheel pair 27 has an idler gear 29 rotatably mounted on the transmission input shaft 26, and a fixed gear 30 non-rotatably mounted on the countershaft 24. The gearwheel pair 28 has an idler gear 31 rotatably mounted on the main shaft 25, and a fixed gear 32 non-rotatably mounted on the countershaft 24. The front-mounted group 12 provides two front-mounted group gear ratios. The front-mounted group 12 converts a rotational speed of the drive machine 19, and selectively converts the rotational speed of the drive machine 19 to a faster speed or a slower speed. The front-mounted group 12 is designed as a splitter group.

The front-mounted group 12 has three shift positions: a high position, a low position, and a neutral position. In the high position, the front-mounted group 12 sets the smaller of the two front-mounted group gear ratios. In the high position, the front-mounted group 12 converts the rotational speed of the drive machine 19 into a faster speed. In the low position, the front-mounted group 12 sets the larger of the two front-mounted group gear ratios. In the low position, the front-mounted group 12 converts the rotational speed of the drive machine 19 into a slower speed. In the neutral position, the front-mounted group 12 prevents transmission of the drive torque into the main group 11. In the neutral position of the front-mounted group 12, the main group 11 and the transmission input shaft 26 are separate from one another in terms of drive. In the neutral position, the front-mounted group 12 separates the transmission input shaft 26 from the countershaft 24 in terms of drive. In the neutral position, the front-mounted group 12 decouples the transmission input shaft 26 from the countershaft 24.

The front-mounted group 12 has a front-mounted group shifting unit 33 for setting and for changing the front-mounted group gear ratio, and thus for shifting the front-mounted group 12. The front-mounted group shifting unit 33 has coupling units provided for establishing a torque-transmitting connection between the transmission input shaft 26 and the countershaft 24 via the corresponding gearwheel pair 27, 28. The front-mounted group 12 has a synchronized design, and is shiftable in the synchronized state. For this purpose, the front-mounted group shifting unit 33 has synchronous elements, which are not illustrated in greater detail. The coupling units are designed as synchronized claw clutches.

The front-mounted group shifting unit 33 has a first shift position, a second shift position, and a neutral position for shifting into the high position, the low position, and the neutral position, respectively. In the first shift position, the front-mounted group shifting unit 33 connects the idler gear 29 to the transmission input shaft 29 in a rotationally fixed manner. In the first shift position, the front-mounted group shifting unit 33 connects the transmission input shaft 26 to the countershaft 24 in a torque-transmitting manner via the gearwheel pair 27. In the second shift position, the front-mounted group shifting unit 33 connects the idler gear 31 to the transmission input shaft 26 in a rotationally fixed manner. In the second shift position, the front-mounted group shifting unit 33 connects the transmission input shaft 26 to the countershaft 24 in a torque-transmitting manner via the gearwheel pair 28. In the neutral position, none of the idler gears 29, 31 are connected to the transmission input shaft 26, and torque cannot be transmitted from the front-mounted group 12 to the countershaft 24. The front-mounted group shifting unit 33 has a shifting sleeve 34 for shifting the front-mounted group 12. The shifting sleeve 34 is axially displaceable with respect to the transmission input shaft 26. The front-mounted group shifting unit 33 is pressure-controlled. The front-mounted group 12 is pneumatically shiftable. In principle, the front-mounted group 12 may also have a hydraulically or electromechanically shiftable design.

The main group 11 includes four different gearwheel pairs 35, 36, 37, 38 for providing an operative connection of the main shaft 25 to the countershaft 24. The gearwheel pairs 35, 36, 37, 38 have different gear ratios. The gearwheel pair 35 has an idler gear 39 rotatably mounted on the main shaft 25 and a fixed gear 40 non-rotatably mounted on the countershaft 24. The gearwheel pair 36 has an idler gear 41 rotatably mounted on the main shaft 25 and a fixed gear 42 non-rotatably mounted on the countershaft 24. The gearwheel pair 37 has an idler gear 43 rotatably mounted on the main shaft 25 and a fixed gear 44 non-rotatably mounted on the countershaft 24. The gearwheel pair 38 has an idler gear 45 rotatably mounted on the main shaft 25, a fixed gear 46 non-rotatably mounted on the countershaft 24, and a reverse gear 47, and is provided for forming the reverse transmission gear.

The main group 11 has three main group shifting units 48, 49, 50 for setting and for changing the main group gear ratio, and thus for shifting the main group 11. The two main group shifting units 48, 49 are provided for engaging the forward transmission gears, and the main group shifting unit 50 is provided for engaging the reverse transmission gear. The main group shifting units 48, 49 each have two shift positions and a neutral position. The main group shifting unit 50 has one shift position and a neutral position.

The main group shifting units 48, 49, 50 each have coupling units provided for establishing a torque-transmitting connection between the main shaft 25 and the countershaft 24 via the corresponding gearwheel pair 35, 36, 37, 38. The main group shifting units 48, 49, 50 are each unsynchronized. The coupling units are designed as unsynchronized claw clutches. The main group 11 is designed as an unsynchronized claw clutch transmission group. Each main group shifting unit 48, 49, 50 has a shifting sleeve 51, 52, 53, respectively, for shifting the main group 11. The shifting sleeve 51 is associated with the main group shifting unit 48, the shifting sleeve 52 is associated with the main group shifting unit 49, and the shifting sleeve 53 is associated with the main group shifting unit 50. The shifting sleeves 51, 52, 53 are each axially displaceable with respect to the main shaft 25. The main group shifting units 48, 49, 50 are each pressure-controlled. The main group 11 is pneumatically shiftable. In principle, the main group 11 may also have a hydraulically or electromechanically shiftable design.

The downstream group 13 has a planet wheel design. The downstream group 13 has a sun wheel 54, a planet carrier 55, and an internal gear 56. Planet wheels 57, 58 which mesh with the sun wheel 54 and with the internal gear 56 are rotatably mounted on the planet carrier 55. For driving the downstream group 13, the sun wheel 54 is connected to the main shaft 25 of the main group 11 in a rotationally fixed manner. An output is achieved via the planet carrier 55. The planet carrier 55 is connected to the transmission output shaft 21 in a rotationally fixed manner. The internal gear 56 is intended for providing a downstream group gear ratio. The downstream group 13 provides two downstream group gear ratios. The downstream group 13 converts the transmission gears which are engaged within the main group 11. The downstream group 13 selectively converts the transmission gears which are engaged within the main group 11 to a faster speed or a slower speed. The downstream group 13 is designed as a range group.

The downstream group 13 has three shift positions: a high position, a low position, and a neutral position. In the high position, the downstream group 13 sets the smaller of the two downstream group gear ratios. In the high position, the downstream group 13 converts the transmission gear which is engaged within the main group 11 to a faster speed. In the low position, the downstream group 13 sets the larger of the two downstream group gear ratios. In the low position, the downstream group 13 converts the transmission gear which is engaged within the main group 11 to a slower speed. In the neutral position, the downstream group 13 prevents transmission of the drive torque to the transmission output shaft 21. In the neutral position of the downstream group 13, the main group 11 and the transmission output shaft 21 are separate from one another in terms of drive. In the neutral position, the downstream group 13 separates the main shaft 25 from the transmission output shaft 21 in terms of drive. In the neutral position, the downstream group 13 decouples the main shaft 25 from the transmission output shaft 21. In the high position, the downstream group 13 has a downstream group gear ratio of 1. In the low position, the downstream group 13 has a downstream group gear ratio of 4.4.

The downstream group 13 has a downstream group shifting unit 59 for setting and for changing the downstream group gear ratio, and thus for shifting the downstream group 13. For shifting the high position, the low position, and the neutral position, the downstream group shifting unit 59 has a first shift position, a second shift position, and a neutral position, respectively. In the first shift position, the downstream group shifting unit 59 connects the internal gear 56 to a gearbox 60 in a rotationally fixed manner. In the second shift position, the downstream group shifting unit 59 connects the internal gear 56 to the transmission output shaft 21 in a rotationally fixed manner. In the second shift position, the sun wheel 54 rotates at the same speed as the planet carrier 55. In the second shift position, the downstream group 13 is shifted into the high position. The transmission output shaft 21 thus has the same rotational speed as the main shaft 25. In the neutral position, the internal gear 56 is freely rotatable, and torque cannot be transmitted from the downstream group 13 to the transmission output shaft 21.

The downstream group 13 has a synchronized design, and is shiftable in the synchronized state. For this purpose, the downstream group shifting unit 59 has synchronous elements, not illustrated in greater detail. The downstream group shifting unit 59 has a shifting element 61 for shifting the downstream group 13. The shifting element 61 is axially displaceable with respect to the transmission output shaft 21. The downstream group shifting unit 59 is pressure-controlled. The downstream group 13 is pneumatically shiftable. In principle, the downstream group 13 may also have a hydraulically or electromechanically shiftable design. In principle, the downstream group 13 may also have a front-mounted design.

The motor vehicle drive train device has an actuating unit 62 for axially moving the shifting sleeves 34, 51, 52, 53 and the shifting element 61, and thus for shifting the main group 11, the front-mounted group 12, and the downstream group 13. The actuating unit 62 is pressure-controlled. The actuating unit 62 has five shift rods 63, 64, 65, 66, 67. The shift rod 63 moves the shifting sleeve 34, the shift rod 64 moves the shifting sleeve 51, the shift rod 65 moves the shifting sleeve 52, the shift rod 66 moves the shifting sleeve 53, and the shift rod 67 moves the shifting element 61. The actuating unit 62 has five actuating devices, not illustrated in greater detail, for the pressure-controlled movement of the shift rods 63, 64, 65, 66, 67, each actuating device being provided for moving one shift rod 63, 64, 65, 66, 67. The actuating devices are designed as pneumatic actuating devices. In principle, the actuating unit 62 may also have a different number of actuating devices which appears meaningful to those skilled in the art.

Sixteen different forward transmission gears having different gear ratios are shiftable by means of the main group 11, the front-mounted group 12, and the downstream group 13. Eight forward transmission gears are provided by engaging four different forward transmission gears within the main group 11 and converting the rotational speed of the drive machine 19 within the front-mounted group 12. The number of available forward transmission gears is doubled due to the downstream group 13 situated downstream. The first eight forward transmission gears are provided by shifting the downstream group 13 into the high position. The forward transmission gears 9 through 16 are provided by shifting the downstream group 13 into the low position. In addition, two different reverse transmission gears having different gear ratios are shiftable by means of the front-mounted group 12, the main group 11, and the downstream group 13. Two reverse transmission gears are provided by engaging a reverse transmission gear within the main group 11 and converting the rotational speed of the drive machine 19 within the front-mounted group 12. The reverse transmission gears are meaningful only when the downstream group 13 is shifted into the high position.

The multi-group transmission 10 also has a synchronization unit 18 providing a braking torque for synchronizing the main group 11. The synchronization unit 18 is provided for synchronizing the countershaft 24. The synchronization unit 18 sets the braking torque for adapting a rotational speed of the countershaft 24 to a rotational speed of the main shaft 25. The synchronization unit 18 is situated on the countershaft 24, and is provided for braking the countershaft 24. The synchronization unit 18 is provided for generating a braking torque that acts on the countershaft 24. The synchronization unit 18 is pneumatically actuatable. The synchronization unit 18 is designed as a mechanical shaft brake, and is provided as a front-mounted shaft brake. In principle, the synchronization unit 18 may also be provided for alternatively or additionally providing a drive torque for synchronizing the main group 11. In principle, the synchronization unit 18 may also be hydraulically or electromechanically actuatable.

The motor vehicle drive train device has a control and regulation unit 14 for setting and for changing the overall gear ratio, and thus for shifting the front-mounted group 12, the main group 11, and the downstream group 13. The control and regulation unit 14 is in communicating connection with the drive machine 19, the actuating unit 62, the starting clutch 23, the synchronization unit 18, and the rotational speed sensor 22. For shifting a transmission gear, the control and regulation unit 14 accordingly shifts the front-mounted group 12, the main group 11, and the downstream group 13 in a transmission gear change operation 15, and controls the synchronization unit 18 for synchronizing the main group 11

Figure 2:
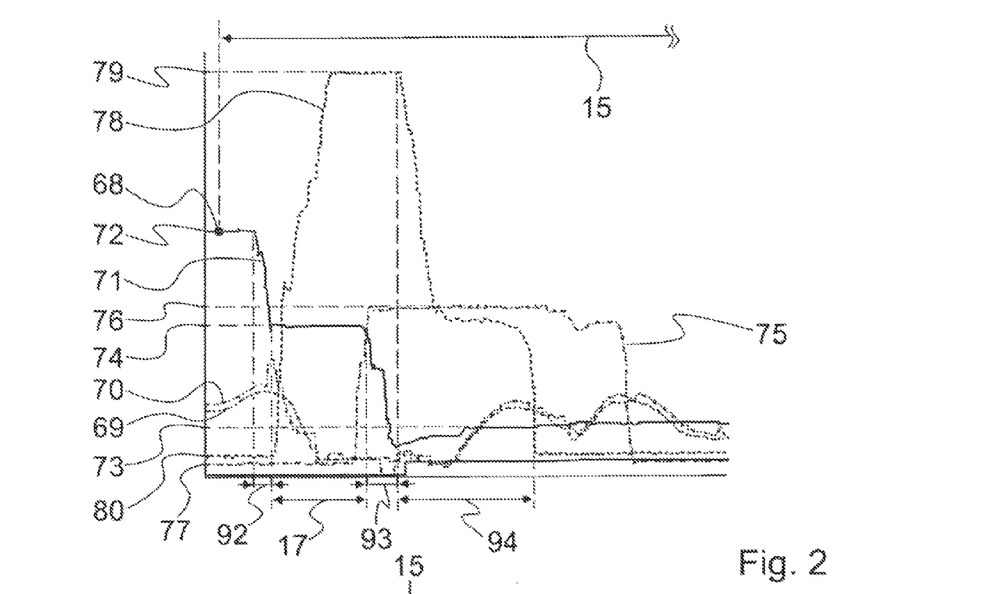
FIG. 2 shows a measured shift sequence for a transmission gear change from a forward transmission gear into a reverse transmission gear during travel.
Figure 3:
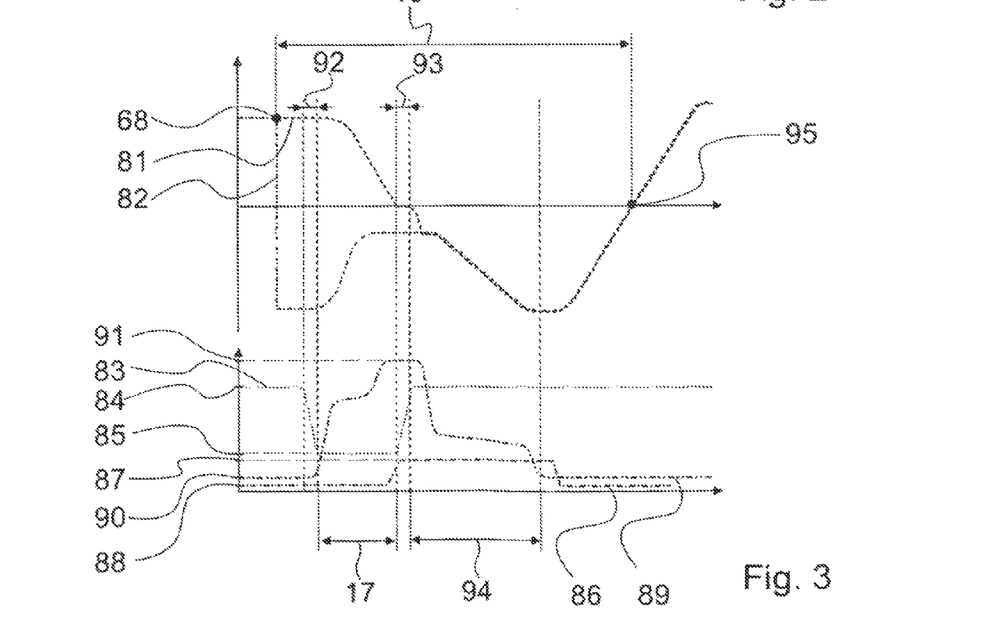
FIG. 3 shows a schematic shift sequence for the transmission gear change according to FIG. 2.

If a driver of the motor vehicle requests a target gear while traveling, starting from a transmission gear that is shifted at that moment, and thus an actual gear, the control and regulation unit 14 triggers a shifting instruction 68, thus initiating the transmission gear change operation 15 by shifting the target gear (see FIG. 2 and FIG. 3). The control and regulation unit 14 shifts the front-mounted group 12 into neutral in the transmission gear change operation 15 before engaging the requested target gear in the main group 11. The control and regulation unit 14 shifts the front-mounted group 12 into the neutral position before engaging the requested target gear. The control and regulation unit shifts the front-mounted group 12 into the neutral position before it engages the requested target gear in the main group 11. The control and regulation unit 14 triggers the torque-transmitting connection between the transmission input shaft 26 and the countershaft 24, by means of the front-mounted group 12, before it engages the requested target gear in the main group 11. For this purpose, the control and regulation unit 14 controls the appropriate actuating device in order to actuate the front-mounted group shifting unit 33. In principle, the front-mounted group 12 may lack a defined neutral position, whereby the front-mounted group 12 may be shifted into a position in which it is shifted neither in the low position nor in the high position, and therefore is shifted into neutral.

The control and regulation unit 14 chronologically offsets the neutral shifting of the front-mounted group 12 with respect to the shifting instruction 68. The shifting instruction 68 and a point in time at which the front-mounted group 12 is shifted into neutral are chronologically offset with respect to one another. The control and regulation unit 14 delays the shifting of the front-mounted group 12 into neutral in the transmission gear change operation 15 until the main group 11 is at least partially synchronized. The control and regulation unit 14 shifts the front-mounted group 12 into neutral only after the main group 11 is partially synchronized. The control and regulation unit shifts the front-mounted group 12 into the neutral position only when the main group 11 is partially synchronized. The control and regulation unit 14 shifts the front-mounted group 12 into neutral in the transmission gear change operation 15 during a synchronization phase 17 of the main group 11. The control and regulation unit shifts the front-mounted group 12 into neutral while it is synchronizing the main group 11 by controlling the synchronization unit 18. The control and regulation unit 14 shifts the front-mounted group 12 into the neutral position during the synchronization phase 17. The countershaft 24 and the main shaft 25 are synchronized with one another in the synchronization phase 17.

The control and regulation unit 14 delays the shifting of the front-mounted group 12 into neutral in the transmission gear change operation 15 until shortly before the requested target gear is engaged. The control and regulation unit shifts the front-mounted group 12 into neutral only immediately before the requested target gear is engaged. The control and regulation unit 14 does not shift the front-mounted group 12 into neutral in the transmission gear change operation 15 until only shortly before the target gear is engaged. The control and regulation unit shifts the front-mounted group 12 into neutral at the end of the synchronization phase 17. In the present exemplary embodiment, the control and regulation unit 14 shifts the front-mounted group 12 into the neutral position approximately 0.1 second before the target gear is engaged.

The control and regulation unit 14 shifts the front-mounted group 12 into neutral in the transmission gear change operation 15 with the main group 11 shifted into neutral. The control and regulation unit shifts the front-mounted group 12 with the actual gear disengaged from neutral. The control and regulation unit 14 shifts the front-mounted group 12 after the actual gear is disengaged, and before the target gear is engaged in neutral. The control and regulation unit does not shift the front-mounted group 12 into the neutral position until after all main group shifting units 48, 49, 50 have been shifted into the neutral position.

For reducing mass moments of inertia during shifting of the downstream group 13, the control and regulation unit 14 shifts the downstream group 13 into a target position with the front-mounted group 12 shifted into neutral. The control and regulation unit 14 shifts the downstream group 13 into its target position in the transmission gear change operation 15 after the front-mounted group 12 has been shifted into neutral. The control and regulation unit shifts the downstream group 13 into its target position with the front-mounted group 12 shifted into the neutral position. The control and regulation unit 14 shifts the downstream group 13 into its target position after the requested target gear is engaged. The control and regulation unit 14 shifts the downstream group 13 into its target position in the transmission gear change operation 15 with the target gear engaged, and with the front-mounted group 12 shifted into neutral.

After the downstream group 13 has been shifted into its target position, the control and regulation unit 14 shifts the front-mounted group 12 into a target position in the transmission gear change operation 15. In the transmission gear change operation 15, the control and regulation unit 14 shifts the front-mounted group 12, which is shifted into neutral, into its target position only after the requested target gear is engaged and the downstream group 13 has been shifted into its target position. In the transmission gear change operation 15, the control and regulation unit 14 first shifts the downstream group 13, and then the front-mounted group 12, which is shifted into neutral, into their target positions after the target gear is engaged.

FIGS. 2 and 3 illustrate the transmission gear change operation 15. In the transmission gear change operation 15, a transmission gear is shifted opposite to the current direction of travel. The target gear is provided as the transmission gear opposite to the current direction of travel. FIGS. 2 and 3 illustrate a transmission gear change from a forward transmission gear into a reverse transmission gear during forward travel. In the transmission gear change operation 15 illustrated in FIGS. 2 and 3, the current direction of travel is provided as the forward direction of travel; the currently engaged transmission gear, and thus the actual gear, is provided as a forward transmission gear; and the transmission gear opposite to the direction of travel, and thus the target gear which is directly shifted during travel, is provided as a reverse transmission gear.

FIG. 2 illustrates a measured shift sequence during the transmission gear change operation 15. A speed curve 69 of the countershaft 24 and a setpoint speed curve 70 of the main shaft 25 during the transmission gear change operation 15 are illustrated in FIG. 2. In addition, FIG. 2 illustrates a curve 71 which describes a shift state 72, 73, 74 of the main group 11, the shift state 72 corresponding to an actual gear engaged within the main group 11, the shift state 73 corresponding to a target gear engaged within the main group 11, and the shift state 74 corresponding to a neutral position of the main group 11 in which the main group 11 is shifted into neutral. A curve 75 illustrated in FIG. 2 describes a shift state 76, 77 of the front-mounted group 12, the shift state 76 corresponding to the neutral position of the front-mounted group 12, and the shift state 77 corresponding to the low position of the front-mounted group 12. In addition, FIG. 2 illustrates a curve 78 describing a shift state 79, 80 of the downstream group 13, the shift state 79 corresponding to the high position, and the shift state 80 corresponding to the low position, of the downstream group 13.

FIG. 3 illustrates a schematic shift sequence of the transmission gear change operation 15. A speed curve 81 of the countershaft 24 and a setpoint speed curve 82 of the main shaft 25 during the transmission gear change operation 15 are illustrated in FIG. 3. The setpoint speed curve 82 represents a speed curve of the main shaft 25 that is converted via a setpoint gear ratio of the main group 11, the setpoint gear ratio representing a gear ratio associated with the target gear, and thus, which is to be shifted. In addition, FIG. 3 illustrates a curve 83 which describes a shift state 84, 85 of the main group 11, the shift state 85 corresponding to a neutral position of the main group 11 in which the main group 11 is shifted into neutral. A curve 86 illustrated in FIG. 3 describes a shift state 87, 88 of the front-mounted group 12, the shift state 87 corresponding to the neutral position of the front-mounted group 12, and the shift state 88 corresponding to the low position of the front-mounted group 12. In addition, FIG. 3 illustrates a curve 89 which describes a shift state 90, 91 of the downstream group 13, the shift state 90 corresponding to the low position, and the shift state 91 corresponding to the high position, of the downstream group 13.

The transmission gear change operation 15 is explained below with reference to FIGS. 2 and 3. Starting from a motor vehicle which is rolling forward and in which a forward transmission gear is shifted, the driver of the motor vehicle requests a reverse transmission gear, and thus, the target gear that is provided as the transmission gear opposite to the current direction of travel, by means of a gear selector lever. The driver actuates the gear selector lever during travel, starting from a forward travel stage "D" into a reverse travel stage "R." The driver requests a change in travel direction. As a result, the control and regulation unit 14 triggers the shifting instruction 68, thus initiating the transmission gear change operation 15 in which the target gear is shifted. Prior to the shifting instruction 68, the speed curve 81 of the countershaft 24 and the setpoint speed curve 82 of the main shaft 25 have the same algebraic sign according to FIG. 3, since the countershaft 24 and the main shaft 25 have a rotational direction which is correct for the actual gear, and thus for the forward transmission gear. Due to the shifting instruction 68, a setpoint rotational direction of the main shaft 25 changes due to the fact that the reverse transmission gear has been requested. The algebraic sign of the setpoint speed curve 82 thus changes, since the main shaft 25 still has a rotational direction which is incorrect for the reverse transmission gear.

After the shifting instruction 68, the control and regulation unit 14 disengages the starting clutch 23 and shifts the main group 11 in order to disengage the actual gear, which is provided as the forward transmission gear. The control and regulation unit 14 disengages the actual gear in a disengagement phase 92 and thus shifts the main group 11 into neutral, as is apparent from the curves 71, 83. The disengagement phase 92 is situated within the transmission gear change operation 15. The control and regulation unit 14 subsequently shifts the downstream group 13 in order to synchronize the main group 11. The control and regulation unit 14 shifts the downstream group 13 to reduce the rotational speed of the main shaft 25. The control and regulation unit shifts the downstream group 13 from the low position into the high position, as is apparent from the curves 78, 89. The control and regulation unit 14 shifts the downstream group 13 into the high position after engaging the actual gear, in order to synchronize the main group 11. The control and regulation unit shifts the downstream group 13 in the synchronization phase 17. The synchronization phase 17 is situated within the transmission gear change operation 15. The main group 11 is shifted into neutral within the synchronization phase 17. No transmission gear is engaged within the main group 11 during the synchronization phase 17. Due to the shifting of the downstream group 13 into the high position, the main shaft 25 is braked by the downstream group 13 and is thus synchronized with the countershaft 24.

In addition, during the synchronization phase 17 the countershaft 24 is braked to zero by means of the synchronization unit 18. For this purpose, the control and regulation unit 14 controls the synchronization unit 18 within the synchronization phase 17. During the synchronization phase 17, the main group 11 is synchronized by the downstream group 13 and the synchronization unit 18. The control and regulation unit 14 controls the front-mounted group 12 during the synchronization phase 17. During the synchronization phase 17, the control and regulation unit 14 shifts the front-mounted group 12 into neutral before the control and regulation unit engages the target gear, which is provided as the reverse transmission gear. The front-mounted group 12 is shifted into neutral during the synchronization phase 17, before the target gear is engaged. The control and regulation unit 14 does not shift the front-mounted group 12 until after the main group 11 is partially synchronized. The control and regulation unit shifts the front-mounted group 12 into neutral, and thus into the neutral position, before the synchronization phase 17 ends, and thus, before the control and regulation unit engages the target gear. The front-mounted group 12 is not shifted into neutral until after the main group 11 is partially synchronized. The front-mounted group 12 is shifted into neutral only shortly before the target gear is engaged.

The synchronization phase 17 is terminated by the braking of the countershaft 24 to zero and the complete shifting of the downstream group 13 into the high position.

After the synchronization phase 17, the control and regulation unit 14 shifts the main group 11 in order to engage the target gear. The target gear is not engaged until after the front-mounted group 12 is shifted into neutral. The control and regulation unit 14 engages the target gear in an engagement phase 93, as is apparent from the curves 71, 83. The engagement phase 93 is situated within the transmission gear change operation 15. The synchronization phase 17 is situated along the transmission gear change operation 15, between the disengagement phase 92 and the engagement phase 93. The control and regulation unit 14 engages the target gear when the front-mounted group 12 is shifted into neutral and the downstream group 13 is shifted into the high position. During the engagement phase 93, the front-mounted group 12 is shifted into the neutral position, and the downstream group 13 is shifted into the high position. After the engagement of the target gear, which is provided as the reverse transmission gear, the countershaft 24 undergoes a reversal in rotational direction, as a result of which the algebraic sign of the speed curve 81 changes.

After the engagement phase 93, and thus after the engagement of the target gear, the control and regulation unit 14 shifts the downstream group 13 into its target position. The control and regulation unit 14 downshifts the downstream group 13 after the target gear is engaged. In a shift phase 94 the control and regulation unit 14 shifts the downstream 13 from the high position back into the low position, as is apparent from the curves 75, 89. The control and regulation unit shifts the downstream group 13 in order to shift the target gear into its target position. The shift phase 94 is situated within the transmission gear change operation 15. During the shift phase 94, the front-mounted group 12 is shifted into neutral, and the target gear within the main group 11 is engaged. The downstream group 13 is shifted into the target position with the front-mounted group 12 shifted into neutral, and with the target gear engaged.

After the downstream group 13 has been shifted into its target position, the control and regulation unit 14 shifts the front-mounted group 12 into its target position. The control and regulation unit downshifts the front-mounted group 12 after the downstream group 13 is shifted. After the shift phase 94 in which the downstream group 13 has been shifted into the target position, the control and regulation unit 14 shifts the front-mounted group 12 from the neutral position into the low position. The front-mounted group 12 is not shifted into its target position until after the downstream group 13 is shifted. After the target gear is engaged, first the downstream group 13, and then the front-mounted group 12, which is shifted into neutral, is shifted into its target position. After the downstream group 13 is shifted into its target position and after the front-mounted group 12 is shifted into its target position, the control and regulation unit 14 engages the starting clutch 23 in an engagement point 95, as the result of which the target gear, which is provided as the reverse transmission gear, is shifted and the change in travel direction takes place. Subsequent to the engagement point 95, the speed curve 81 and the setpoint speed curve 82 have a positive algebraic sign, since they each have the correct rotational direction for the target gear, and thus, the reverse transmission gear. The transmission gear change operation 15 is terminated by engaging the starting clutch 23, and thus, subsequent to the engagement point 95. The engagement point 95 is not illustrated in FIG. 2. In principle, shifting the downstream group 13 in order to synchronize the main group 11 may be dispensed with. The transmission gear change operation 15 may, in principle, also be designed as a normal transmission gear change, i.e., not as a travel direction operation, in which a shift is made between forward transmission gears or reverse transmission gears, such as a transmission gear change operation in which a switch is made from a third forward transmission gear into the fourth forward transmission gear. The shift sequence during the normal transmission gear change has an analogous design to that described above, the shifting of the downstream group 13 into the high position being dispensed with. The downstream group 13 may likewise be shifted into neutral before the target gear is engaged.

It is explicitly noted that in the present exemplary embodiment, the shifting of the front-mounted group 12 into neutral is achieved by shifting the front-mounted group 12 into the neutral position. However, the shifting into neutral may also be achieved when there is no neutral position of the front-mounted group 12, in that the front-mounted group 12 is shifted into a position in which neither the low position nor the high position is shifted.

In the present exemplary embodiment, the control and regulation unit 14 shifts only the front-mounted group 12 into neutral before the target gear is engaged. It is explicitly noted once more that the downstream group 13 may additionally or alternatively be shifted into neutral before the target gear is engaged. The shifting of the downstream group 13 into neutral takes place analogously to the shifting of the front-mounted group 12 into neutral. Furthermore, it is possible in principle for the control and regulation unit 14 to have a shifting strategy in which only the front-mounted group 12 is shifted into neutral, and a shifting strategy in which the front-mounted group 12 and the downstream group 13 are shifted into neutral. Whether or not the control and regulation unit 14 shifts only the front-mounted group 12 or the front-mounted group 12, and additionally the downstream group 13, into neutral before the target gear is engaged depends, for example, on the requested target gear. If the target gear is provided, for example, as a transmission gear in the same direction as the current direction of travel, i.e., if a switch is made between forward transmission gears or between reverse transmission gears, for example from a third forward transmission gear into a fourth forward transmission gear, the control and regulation unit 14 shifts the front-mounted group 12 and the downstream group 13 into neutral. If the target gear is provided as a transmission gear opposite to the current direction of travel, and during travel is either shifted from the forward transmission gear into the reverse transmission gear or from the reverse transmission gear into the forward transmission gear, the control and regulation unit 14 shifts only the front-mounted group 12 into neutral before the target gear is engaged, and utilizes the downstream group 13 for synchronizing the main group 11.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A motor vehicle drive train device, comprising:
 a multi-group transmission which includes a main group, a front-mounted group upstream from the main group, and/or a downstream group downstream from the main group; and
 a control/regulation unit,
 wherein the motor vehicle drive train device is configured to shift, at least in one transmission gear change operation, the front-mounted group and/or the downstream group into neutral before engaging a target gear in the main group,
 wherein the control/regulation unit is configured to shift the front-mounted group and/or the downstream group into neutral in the transmission gear change operation only after at least partial synchronization of the main group, and
 wherein the control/regulation unit is configured to shift the downstream group in the transmission gear change operation when the front-mounted group is shifted into neutral.

2. The motor vehicle drive train device of claim 1, wherein the control/regulation unit is configured to shift the front-mounted group and/or the downstream group into neutral in the transmission gear change operation only shortly before the target gear is engaged.

3. The motor vehicle drive train device of claim 1, wherein the target gear is a transmission gear opposite to a current direction of travel.

4. The motor vehicle drive train device of claim 1, wherein the control/regulation unit is configured to shift the front-mounted group and/or the downstream group into neutral in the transmission gear change operation during a synchronization phase of the main group.

5. The motor vehicle drive train device of claim 1, wherein the control/regulation unit is configured to first shift the downstream group, and then the front-mounted group, into a target position in the transmission gear change operation after the target gear is engaged.

6. The motor vehicle drive train device of claim 1, wherein the control/regulation unit is configured to shift the front-mounted group and/or the downstream group into neutral in the transmission gear change operation when the main group is shifted into neutral.

7. The motor vehicle drive train device of claim 1, further comprising:
 a synchronization unit configured to provide a braking torque and/or a drive torque in order to synchronize the main group.

8. The motor vehicle drive train device of claim 1, wherein the main group is an unsynchronized claw clutch transmission group.

9. The motor vehicle drive train device of claim 1, wherein the front-mounted group and/or the downstream group has/have a synchronized design.

10. A method for shifting a multi-group transmission of a motor vehicle drive train device that comprises a multi-group transmission including a main group, a front-mounted group upstream from the main group, and/or a downstream group downstream from the main group, and a control/regulation unit, the method comprising:
- shifting, by the motor vehicle drive train device, at least in one transmission gear change operation, the front-mounted group and/or the downstream group into neutral before engaging a target gear in the main group,
- shifting, by the control/regulation unit, the front-mounted group and/or the downstream group into neutral in the transmission gear change operation only after at least partial synchronization of the main group; and
- shifting, by the control/regulation unit, the downstream group in the transmission gear change operation when the front-mounted group is shifted into neutral.

11. The method of claim 10, wherein the control/regulation unit is configured to shift the front-mounted group and/or the downstream group into neutral in the transmission gear change operation only shortly before the target gear is engaged.

12. The method of claim 10, wherein the target gear is a transmission gear opposite to a current direction of travel.

13. The method of claim 10, wherein the control/regulation unit is configured to shift the front-mounted group and/or the downstream group into neutral in the transmission gear change operation during a synchronization phase of the main group.

14. The method of claim 10, wherein the control/regulation unit is configured to first shift the downstream group, and then the front-mounted group, into a target position in the transmission gear change operation after the target gear is engaged.

15. The method of claim 10, wherein the control/regulation unit is configured to shift the front-mounted group and/or the downstream group into neutral in the transmission gear change operation when the main group is shifted into neutral.

16. The method of claim 10, wherein a synchronization unit provides a braking torque and/or a drive torque in order to synchronize the main group.

17. The method of claim 10, wherein the main group is an unsynchronized claw clutch transmission group.

18. The method of claim 10, wherein the front-mounted group and/or the downstream group has/have a synchronized design.

* * * * *